US008638254B2

(12) United States Patent
Itoh et al.

(10) Patent No.: US 8,638,254 B2
(45) Date of Patent: Jan. 28, 2014

(54) SIGNAL PROCESSING DEVICE, RADAR DEVICE, VEHICLE CONTROL SYSTEM, SIGNAL PROCESSING METHOD, AND COMPUTER-READABLE MEDIUM

(75) Inventors: Jun Itoh, Kobe (JP); Tokio Shinagawa, Kobe (JP); Daisuke Nakabayashi, Kobe (JP); Hiroyuki Ishimori, Kobe (JP)

(73) Assignee: Fujitsu Ten Limited, Kobe-Shi (JP)

( * ) Notice: Subject to any disclaimer, the term of this patent is extended or adjusted under 35 U.S.C. 154(b) by 210 days.

(21) Appl. No.: 12/868,355

(22) Filed: Aug. 25, 2010

(65) Prior Publication Data
US 2011/0050481 A1 Mar. 3, 2011

(30) Foreign Application Priority Data

Aug. 27, 2009 (JP) ................................. 2009-196711
Aug. 27, 2009 (JP) ................................. 2009-196712

(51) Int. Cl.
*G01S 13/00* (2006.01)
*G01S 13/08* (2006.01)

(52) U.S. Cl.
USPC ................ 342/70; 342/95; 342/128; 342/192

(58) Field of Classification Search
USPC ......................... 342/70–72, 95, 109, 128, 192
See application file for complete search history.

(56) References Cited

U.S. PATENT DOCUMENTS

| | | | | |
|---|---|---|---|---|
| 5,731,778 A | * | 3/1998 | Nakatani et al. | 342/70 |
| 6,657,582 B2 | * | 12/2003 | Seki et al. | 342/70 |
| 6,731,235 B2 | * | 5/2004 | Kishida et al. | 342/128 |
| 6,861,973 B2 | * | 3/2005 | Kishida | 342/109 |
| 6,888,494 B2 | * | 5/2005 | Tamatsu et al. | 342/128 |
| 6,900,754 B2 | * | 5/2005 | Ono et al. | 342/158 |
| 6,970,129 B2 | * | 11/2005 | Kumon et al. | 342/70 |

(Continued)

FOREIGN PATENT DOCUMENTS

| | | |
|---|---|---|
| JP | A-2-44274 | 2/1990 |
| JP | A-11-133144 | 5/1999 |

(Continued)

OTHER PUBLICATIONS

Jul. 23, 2013 Office Action issued in Japanese Application No. 2009-196711 (with partial English translation).

(Continued)

*Primary Examiner* — Jack W Keith
*Assistant Examiner* — Peter Bythrow
(74) *Attorney, Agent, or Firm* — Oliff & Berridge, PLC

(57) ABSTRACT

A signal processing device performs object detection processing in which peak signals each representing a differential frequency between a transmitted signal in which a frequency thereof changes in a predetermined cycle and a received signal are derived in a first period where the frequency of the transmitted signal rises and a second period where the frequency of the transmitted signal falls, and the peak signals in the first period are paired with the peak signals in the second period to detect object information related to the peak signals. A range setting unit sets a frequency range in each of the first period and the second period on the basis of a frequency of an integer multiple of the peak signal related to the object information which has been detected in previous object detection processing. A signal setting unit sets a peak signal as a specific peak signal in a case where the peak signal is within the frequency range in each of the first period and the second period. A paring unit pairs the specific peak signal in the first period and the specific peak signal in the second period.

7 Claims, 9 Drawing Sheets

(56) References Cited

U.S. PATENT DOCUMENTS

| | | | |
|---|---|---|---|
| 6,999,024 B2* | 2/2006 | Kumon et al. | 342/70 |
| 7,136,753 B2* | 11/2006 | Samukawa et al. | 701/301 |
| 7,242,344 B2* | 7/2007 | Mitsumoto | 342/70 |
| 7,271,761 B2* | 9/2007 | Natsume et al. | 342/128 |
| 7,336,218 B2* | 2/2008 | Nishimura et al. | 342/70 |
| 7,385,550 B2* | 6/2008 | Winter et al. | 342/70 |
| 2003/0112173 A1* | 6/2003 | Seki et al. | 342/70 |
| 2003/0156055 A1* | 8/2003 | Tamatsu et al. | 342/70 |
| 2003/0222812 A1* | 12/2003 | Kishida | 342/109 |
| 2004/0125010 A1* | 7/2004 | Natsume et al. | 342/70 |
| 2008/0186224 A1* | 8/2008 | Ichiyanagi et al. | 342/109 |

FOREIGN PATENT DOCUMENTS

| | | |
|---|---|---|
| JP | A-11-344560 | 12/1999 |
| JP | A-2003-167045 | 6/2003 |
| JP | A-2003-177178 | 6/2003 |
| JP | A-2003-240843 | 8/2003 |
| JP | A-2003-270342 | 9/2003 |
| JP | A-2004-245647 | 9/2004 |
| JP | A-2005-30809 | 2/2005 |
| JP | A-2005-134266 | 5/2005 |
| JP | A-2006-266907 | 10/2006 |
| JP | 2008-190964 | 8/2008 |
| JP | A-2008-286647 | 11/2008 |

OTHER PUBLICATIONS

Japanese Patent Office, Notice of Rejection mailed Aug. 20, 2013 in Japanese Patent Application No. 2009-196712 w/Partial English-language Translation.

* cited by examiner

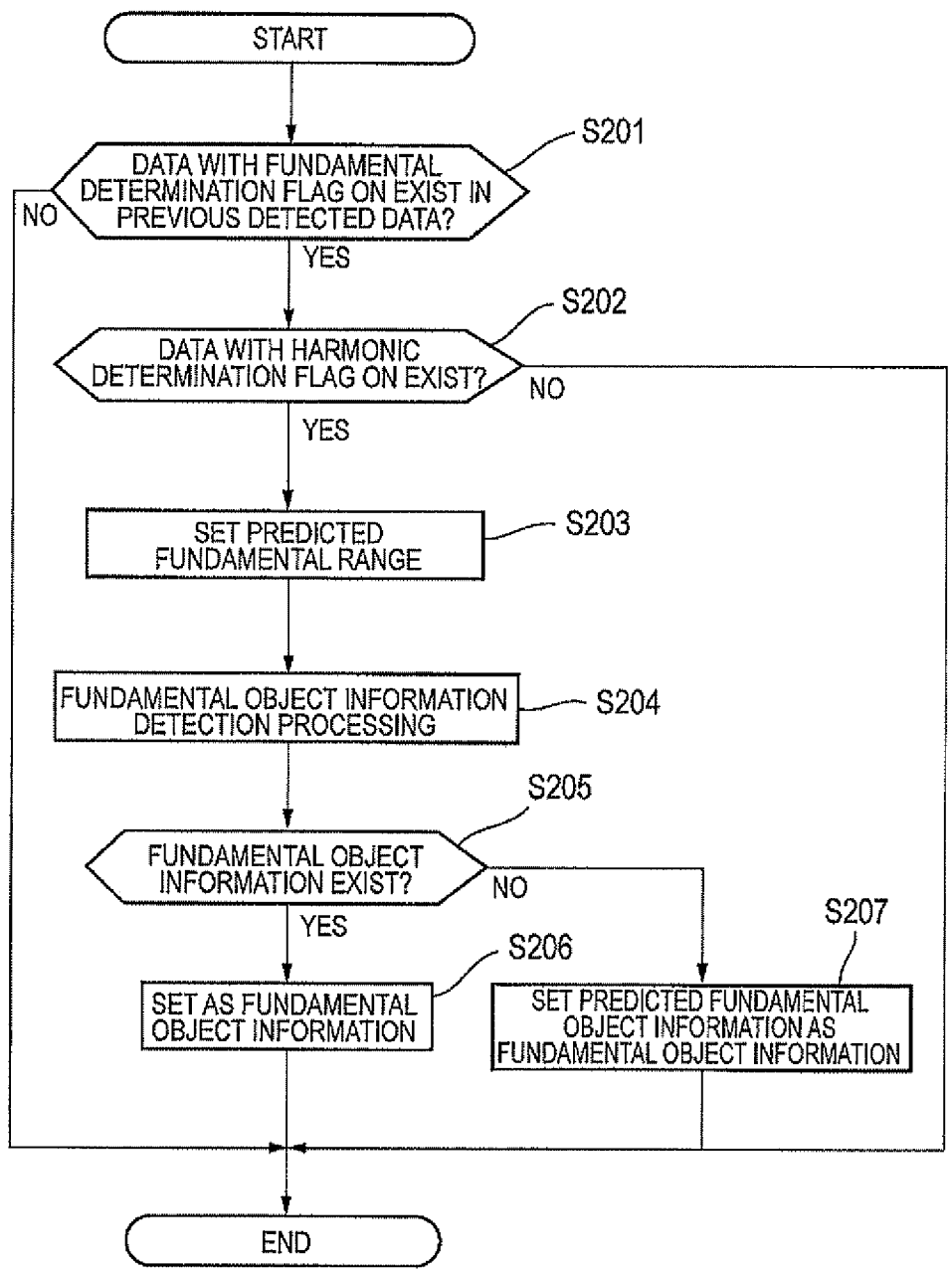

SIGNAL PROCESSING DEVICE, RADAR DEVICE, VEHICLE CONTROL SYSTEM, SIGNAL PROCESSING METHOD, AND COMPUTER-READABLE MEDIUM

The disclosures of Japanese Patent Application No. 2009-196711 and No. 2009-196712 filed on Aug. 27, 2009, including specifications, drawings and claims are incorporated herein by reference in its entirety.

BACKGROUND

The present invention relates to a technique which detects an object on the basis of information from a transmitted wave and a received wave.

When an object is detected using a radar device, a transmitted signal obtained from a transmitted wave and a received signal obtained from a received wave are mixed, and the relative distance and relative speed of the object are detected from a peak signal detected by the difference in frequency of the transmitted signal and the received signal.

In detecting the relative distance and relative speed of the object from the peak signal, a beat signal which is generated by mixing the transmitted signal and the received signal is A/D converted by an A/D converter (Analog to Digital Converter) and input to a signal processing device, such as a microcomputer. Then, the signal processing device carries out FFT (Fast Fourier Transform) processing for the beat signal to detect a frequency spectrum.

In general, the frequency spectrum of the object has a relatively larger power level than the frequency spectrum of noise, or the like, thus a frequency spectrum which exceeds a threshold value at a predetermined power level is detected as the peak signal. Then, the relative distance and relative speed of the object are detected on the basis of the detected peak signal.

In detecting the relative distance and relative speed of the object, when the level of the transmitted signal is set to be constant, the power level of the received signal has variations depending on the reflection sectional area of the object, the distance from the radar device to the object, and the relative speed of the vehicle with the radar device and the object. In particular, the power level of a received signal of an object having a short relative distance increases compared to the power level of a received signal of an object having a long relative distance. If the power level of the received signal increases and then exceeds the saturation level of a receiving circuit including a mixer or an A/D converter, the beat signal is sampled as a substantially square wave.

Then, the FFT processing is carried out for the beat signal which is sampled as a substantially rectangular wave, such that a corresponding frequency spectrum is detected.

The frequency spectrum which is generated from the beat signal as a substantially square wave includes a frequency spectrum related to an existent object and a frequency spectrum of an integer multiple related to the object. Then, the power level of the frequency spectrum generated from the beat signal as a substantially square wave is greater than the level of another frequency spectrum in correspondence with the saturation level of the receiving circuit including the A/D converter, and thus exceeds the threshold value for detection of the peak signal. As a result, the relative distance and relative speed of a non-existent object may be erroneously detected, which may cause a problem for vehicle control.

When the relative distance from the object is short, part of the transmitted wave is multiple-reflected by the object, and a beat signal detected by single reflection from the object and a beat signal detected by multiple reflection from the object are generated. If a frequency spectrum corresponding to the beat signal detected by multiple reflection from the object exceed the threshold value for detection of the peak signal, a peak signal which is non-existent as an object is detected. As a result, the relative distance and relative speed of the non-existent object may be erroneously detected, which may cause a problem for vehicle control.

With regard to the above-described problem, in the related art, a method is suggested which decreases the level of the transmitted signal in advance to decrease the level of the received signal.

Further, a method is suggested which uses a receiving circuit having a large saturation level to prevent an integer-multiplied frequency spectrum from being detected as a peak signal (for example, JP-A-11-133144).

However, the threshold value for detection of power of the frequency spectrum of the object having a short relative distance from the vehicle is set to be greater than the threshold value for detection of power of the frequency spectrum of an integer multiple of the peak signal of the object having a short relative distance. This is to prevent noise from being erroneously detected as the peak signal of the object since a frequency spectrum generated by the effect of noise due to frequency modulation of the transmitted wave or the received wave or noise from hardware equipment is generated a lot in a low frequency band.

Accordingly, if the level of the received signal decreases, the frequency spectrum of the object having a short relative distance has a large threshold value for detection of power of the frequency spectrum, thus the frequency spectrum falls below the threshold value and is not detected as a peak signal. The frequency spectrum of the integer multiple of the peak signal of the object having a short relative distance has a small threshold value, thus the frequency spectrum exceeds the threshold value and is detected as a peak signal. For this reason, during pairing processing in which peak signals in predetermined periods at the time of transmission/reception are paired so as to detect an object, erroneous pairing may be carried out for a peak signal related to a non-existent object and a peak signal related to an existent object. As a result, erroneous vehicle control may be performed. In addition, while a non-existent object is detected, an object having a short relative distance from an existent vehicle may not be detected. As a result, during continuous determination processing in which it is determined whether information related to the same object is continuously detected or not, even when an object is actually existent, object detection is impossible, thus an object may not be continuously detected and not subject to vehicle control. Further, the use of the receiving circuit having a large saturation level described in JP-A-11-133144 leads to an undesirable increase in cost of the radar device.

SUMMARY

It is therefore an object of at least one embodiment of the present invention to provide a technique capable of accurately detecting object information.

In order to achieve at least one of the above-described objects, according to a first aspect of the embodiments of the present invention, there is provided a signal processing device that performs object detection processing in which peak signals each representing a differential frequency between a transmitted signal in which a frequency thereof changes in a predetermined cycle and a received signal obtained by receiving a reflected wave of a transmitted wave based on the transmitted signal from an object are derived in a first period where the frequency of the transmitted signal rises and a second period where the frequency of the transmitted signal falls, and the peak signals in the first period are paired with the peak signals in the second period to detect object information related to the peak signals, the signal processing device comprising: a range setting unit that sets a frequency range in each of the first period and the second period on the basis of a frequency of an integer multiple of the peak signal related to the object information which has been detected in previous object detection processing; a signal setting unit that sets a peak signal as a specific peak signal in a case where the peak signal is within the frequency range in each of the first period and the second period; and a paring unit that pairs the specific peak signal in the first period and the specific peak signal in the second period.

With this configuration, a peak signal which is likely to be a non-existent object is set as a specific peak signal on the basis of a frequency of an integer multiple of a peak signal related to previously detected object information, and the specific peak signals of the first period and the second period are paired. For this reason, there is no possibility that erroneous pairing is carried out for a peak signal related to a non-existent object and a peak signal related to an existent object, such that object information can be accurately detected.

The signal processing device may further comprise: an information setting unit that sets object information related to the specific peak signal as specific object information in a case where the specific peak signal in the first period are paired with the specific peak signal in the second period; and a determining unit that determines whether the specific object information is continuously detected over multiple continuous object detection processing.

With this configuration, the continuity of an object detected during each of multiple continuous object detection processing is determined, and when the vehicle is controlled in accordance with the situation of the object, the continuity is determined on the basis of specific object information which is likely to be a non-existent object. Therefore, the continuity determination can be prevented from being erroneously carried out on the basis of object information related to a non-existent object and object information related to an existent object.

The signal processing device may be configured to be mounted in a vehicle, and the signal processing device may further comprise an acquiring unit that acquires a speed of the vehicle. The signal setting unit may set the peak signal as the specific peak signal only when the speed of the vehicle is lower than a predetermined speed.

With this configuration, when the vehicle is traveling at a low speed, many objects are detected at a short distance from the vehicle. For this reason, when the vehicle is traveling at a low speed, harmonics are likely to occur. In this case, the specific peak signal is set, such that object information can be accurately detected.

According to a second aspect of the embodiments of the present invention, there is provided a radar device comprising: the signal processing device described above; a transmitting and receiving unit that outputs the transmitted wave and receives the reflected wave; and an outputting unit that outputs the object information detected in the object detection processing of the signal processing device to an electronic control device which uses the object information.

With this configuration, object information subjected to continuity determination can be output to the electronic control device on the basis of accurate pairing.

According to a third aspect of the embodiments of the present invention, there is provided a vehicle control system comprising: the radar device described above; and a control unit that controls a vehicle on the basis of the object information output from the radar device.

With this configuration, vehicle control is performed on the basis of accurate object information detected by the radar device, such that safe vehicle control can be provided to the user.

According to a fourth aspect of the embodiments of the present invention, there is provided a signal processing method for performing object detection processing in which peak signals each representing a differential frequency between a transmitted signal in which a frequency thereof changes in a predetermined cycle and a received signal obtained by receiving a reflected wave of a transmitted wave based on the transmitted signal from an object are derived in a first period where the frequency of the transmitted signal rises and a second period where the frequency of the transmitted signal falls, and the peak signals in the first period are paired with the peak signals in the second period to detect object information related to the peak signals, the signal processing method comprising: setting a frequency range in each of the first period and the second period on the basis of a frequency of an integer multiple of the peak signal related to the object information which has been detected in previous object detection processing; setting a peak signal as a specific peak signal in a case where the peak signal is within the frequency range in each of the first period and the second period; and pairing the specific peak signal in the first period and the specific peak signal in the second period.

According to a fifth aspect of the embodiments of the present invention, there is provided a computer-readable medium recording a program causing a computer to execute the method described above.

According to a sixth aspect of the embodiments of the present invention, there is provided a signal processing device that performs object detection processing in which peak signals each representing a differential frequency between a transmitted signal in which a frequency thereof changes in a predetermined cycle and a received signal obtained by receiving a reflected wave of a transmitted wave based on the transmitted signal from an object are derived in a first period where the frequency of the transmitted signal rises and a second period where the frequency of the transmitted signal falls, and the peak signals in the first period are paired with the peak signals in the second period to detect object information related to the peak signals, the signal processing device comprising: a determining unit that determines object information related to the same object is continuously detected over multiple continuous object detection processing; a detecting unit that detects specific object information having a predetermined distance parameter value on the basis of the object information which has detected in previous object detection processing; and a setting unit that virtually sets predicted object information having a distance parameter value calculated from the specific object information in a case where the specific object information is detected, wherein the determining unit includes object information detected in the latest object detection processing and the predicted object information in a determination thereof.

With this configuration, object information detected by object detection processing and predicted object information derived from specific object information based on a harmonic of the object information are object information candidates, such that the continuity of object information detection can be secured.

The determining unit may include the predicted object information in the determination thereof in a case where no object information detected in the latest object detection processing is within a detection range set on the basis of the specific object information.

With this configuration, even when no object information is detected by the object detection processing, if specific object information of a harmonic of the object information is detected, it is assumed that there is object information. Therefore, the continuity of object detection can be secured with specific object information of a harmonic as object information subject to continuous detection determination.

The signal processing device may further comprise a storing unit that stores the object information therein. The determining unit may include the predicted object information in the determination thereof only when the object information detected in the previous object detection processing is not continuously detected over multiple continuous object detection processing and the object information stored in the storing unit is erased.

With this configuration, if object information stored in the storing unit of the signal processing device is not continuously detected, it is confirmed whether or not there is specific object information generated on the basis of object information before object information is erased from the storage unit, and when there is specific object information, it is assumed that there is object information, such that the continuity of object information can be secured.

The signal processing device may be configured to be mounted in a vehicle, and the signal processing device may further comprise an acquiring unit that acquires a speed of the vehicle. The determining unit may include the predicted object information in the determination thereof only when the speed of the vehicle is lower than a predetermined speed.

With this configuration, when the vehicle is traveling at a low speed, many objects are detected at a short distance from the vehicle. For this reason, while object information is not detected, only specific object information of a harmonic generated on the basis of object information may be detected. Therefore, the accurate position or speed of the object is detected from specific object information, such that the behavior of the object can be continuously detected.

According to a seventh aspect of the embodiments of the present invention, there is provided a radar device comprising: the signal processing device described above; a transmitting and receiving unit that outputs the transmitted wave and receives the reflected wave; and an outputting unit that outputs the object information detected in the object detection processing of the signal processing device to an electronic control device which uses the object information.

With this configuration, even when object information cannot be detected, specific object information based on a harmonic of the object information is used as object information subject to continuous detection determination, such that the continuity of object information detection is secured. Therefore, information of a vehicle control target can be output to the electronic control device.

According to an eighth aspect of the embodiments of the present invention, there is provided a vehicle control system comprising: the radar device described above; and a control unit that controls a vehicle on the basis of the object information output from the radar device.

With this configuration, vehicle control can be performed on the basis of accurate object information detected by the radar device. Therefore, safe vehicle control can be provided to the user.

According to a ninth aspect of the embodiments of the present invention, there is provided a signal processing method for performing object detection processing in which peak signals each representing a differential frequency between a transmitted signal in which a frequency thereof changes in a predetermined cycle and a received signal obtained by receiving a reflected wave of a transmitted wave based on the transmitted signal from an object are derived in a first period where the frequency of the transmitted signal rises and a second period where the frequency of the transmitted signal falls, and the peak signals in the first period are paired with the peak signals in the second period to detect object information related to the peak signals, the signal processing method comprising: determining object information related to the same object is continuously detected over multiple continuous object detection processing; detecting specific object information having a predetermined distance parameter value on the basis of the object information which has detected in previous object detection processing; and virtually setting predicted object information having a distance parameter value calculated from the specific object information in a case where the specific object information is detected, wherein object information detected in the latest object detection processing and the predicted object information are included in the determining.

According to a tenth aspect of the embodiments of the present invention, there is provided a computer-readable medium recording a program causing a computer to execute the method described above.

BRIEF DESCRIPTION OF THE DRAWINGS

In the accompanying drawings:

FIG. 9 is a flowchart of fundamental object information setting processing.

DETAILED DESCRIPTION OF THE EMBODIMENTS

Hereinafter, embodiments of the invention will be described with reference to the drawings.

<1. Configuration>

Figure 1:
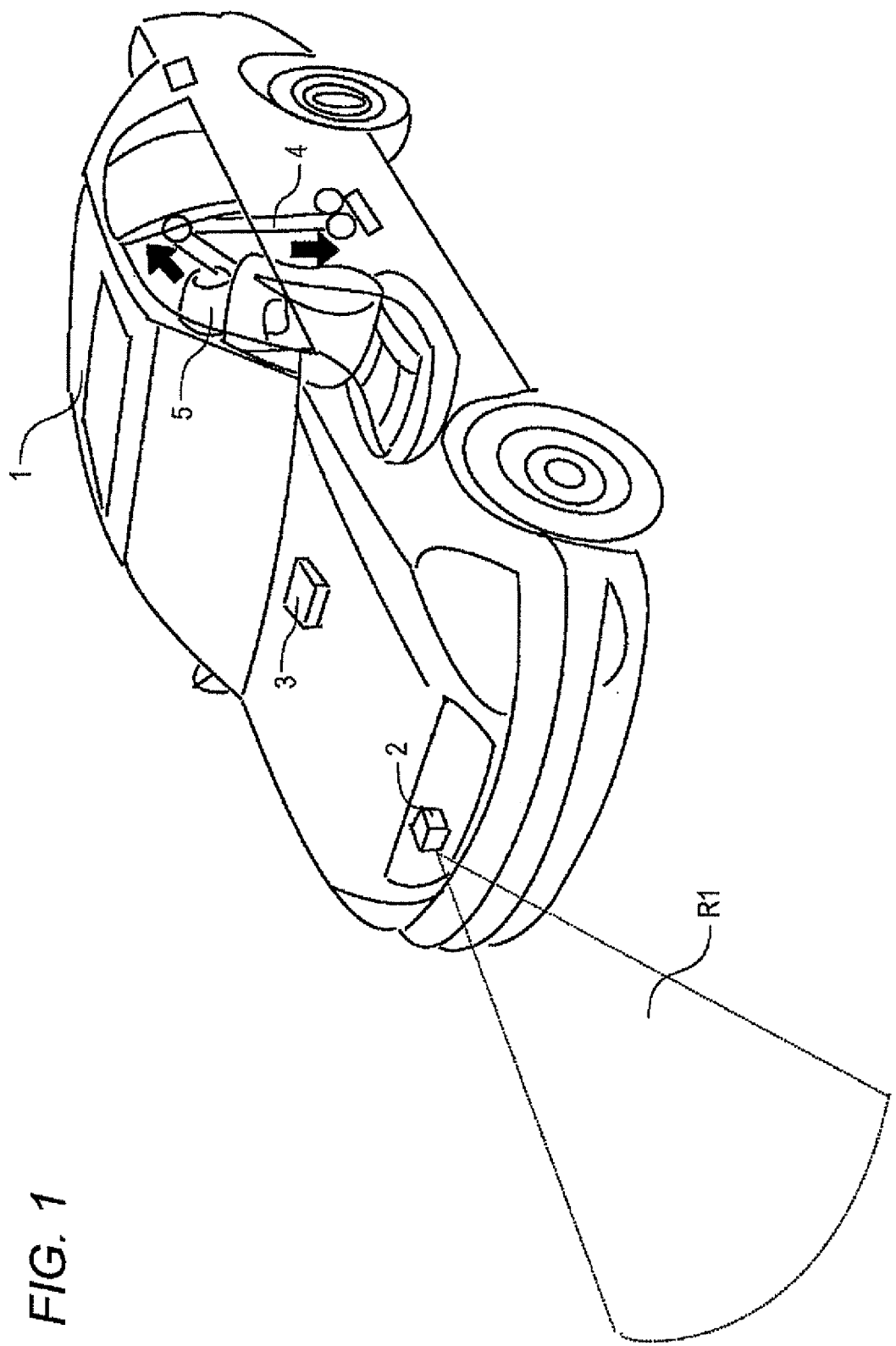
FIG. 1 is an overall view illustrating a vehicle.

FIG. 1 is an overall view of a vehicle 1. The vehicle 1 includes a radar device 2 and an electronic control device 3 which are elements provided in an object detection system of this embodiment. The radar device 2 is provided at the front portion of the vehicle. The radar device 2 scans the range of a detection range R1 to calculate the relative distance and relative speed between the vehicle 1 and an object and to calculate the angle of an object when viewed from the vehicle 1. The mounting position of the radar device 2 is not limited to the front portion of the vehicle, and the radar device 2 may be provided at the rear or side portion of the vehicle 1.

The electronic control device 3 performs vehicle control of the vehicle 1 in accordance with the object detection result of the radar device 2. Examples of vehicle control include accelerator control or brake control when the vehicle is traveling after a preceding vehicle and brake control for collision prevention. Further, the electronic control device 3 moves a seatbelt 4 in a direction indicated by an arrow to fasten a passenger to a seat and to brace for impact at the time of collision, or moves a headrest 5 in a direction indicated by an arrow to reduce damage to the body of a passenger.

Figure 2:
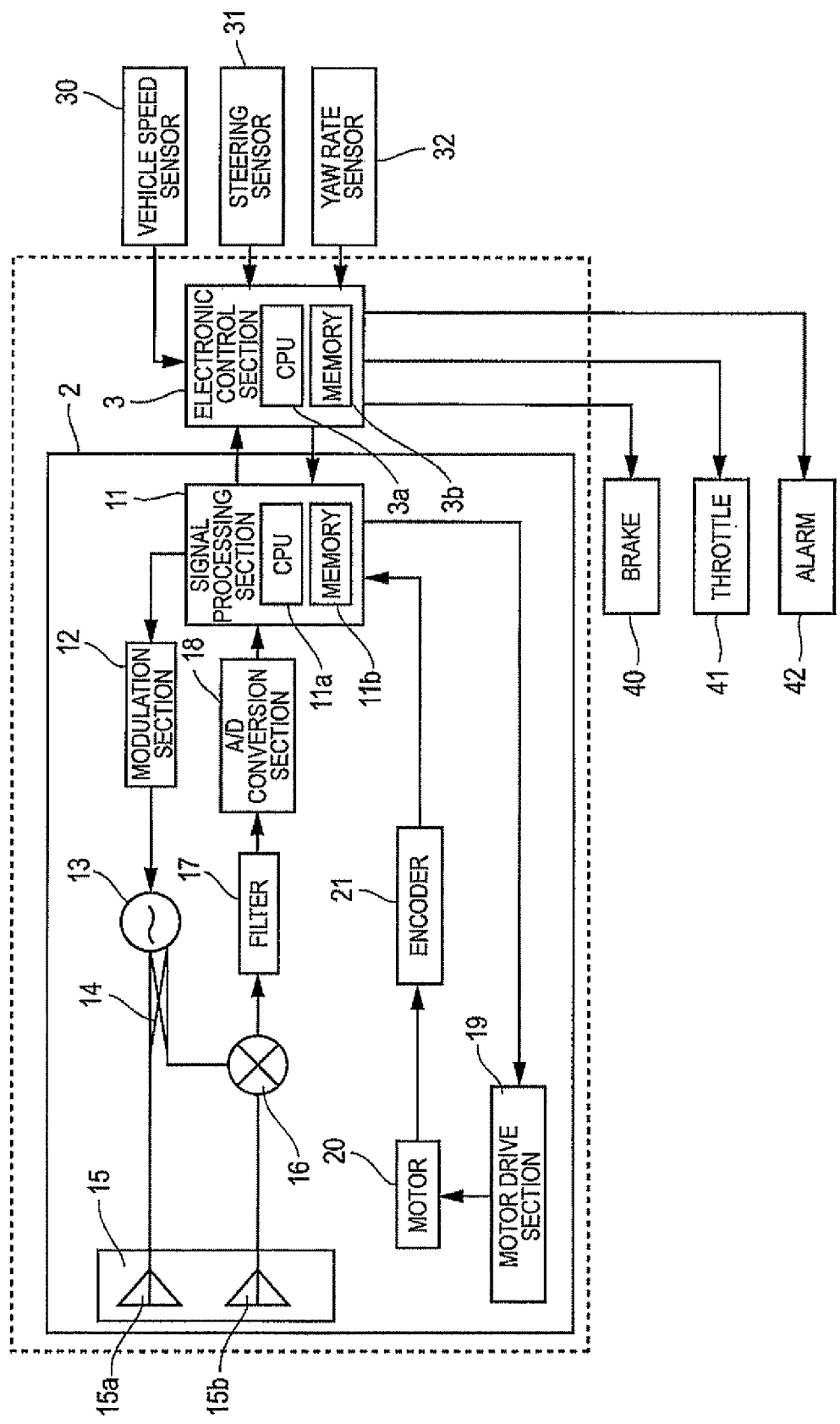
FIG. 2 is a block diagram illustrating an object detection system according to an embodiment of the present invention.

FIG. 2 is a block diagram of an object detection system. An object detection system 10 is configured such that the radar device 2 and the electronic control device 3 are electrically connected to each other. The electronic control section 3 of the object detection system 10 is electrically connected to various sensors provided in the vehicle 1, such as a vehicle speed sensor 30, a steering sensor 31, a yaw rate sensor 32, and the like. The electronic control section 3 is also electrically connected to vehicle control devices provided in the vehicle 1, such as a brake 40, a throttle 41, an alarm 42, and the like.

The radar device 2 includes a signal processing section 11, a modulation section 12, a VCO (Voltage Controlled Oscillation) 13, a directional coupler 14, a planar antenna 15, a mixer 16, a filter 17, an A/D (Analog Digital) converter 18, a motor drive circuit 19, a motor 20, and an encoder 21. The planar antenna 15 has a transmitting antenna 15a and a receiving antenna 15b. Although in the following embodiment, description will be provided for a case where an antenna scanning method of the radar device 2 is a mechanical scanning method, the invention may be applied to an antenna-fixed electronic scanning method in which a DBF (Digital Beam Forming) method or the like is used for object direction estimation.

With regard to object detection by the radar device 2, the modulation section 12 generates a modulated signal in a frequency band set in advance on the basis of a signal from the signal processing section 11. The modulated signal is converted to a transmitted signal by the VCO 13 and output from the planar antenna 15 of the transmitting antenna 15a through the directional coupler 14 as a transmitted signal.

The transmitted wave output from the planar antenna 15 hits and is reflected by an object, and is received by the planar antenna 15 as a reflected wave. The received reflected wave and an oscillation signal are mixed by the mixer 16 through the directional coupler 14.

A received signal mixed with the transmitted signal is a beat signal which includes information of the relative distance or relative speed with respect to the object and is filtered by the filter 17. Thus, a beat signal is detected in a band including information of the relative distance or the relative speed from the vehicle 1 having the radar device 2 to the object.

The beat signal which is filtered into a predetermined frequency band by the filter 17 is converted from an analog signal to a digital signal by the A/D converter 18 and is then input to the signal processing section 11.

The radar device 2 scans the planar antenna 15 in a predetermined angle range. If the radar device 2 is provided at the front bumper portion of the vehicle 1 and a preceding vehicle is located directly in front of the vehicle 1, the angle of the planar antenna 15 is set to be 0 degree when the planar antenna 15 is perpendicular to the preceding vehicle. For example, the planar antenna 15 scans by 15 degrees left and right from the state of 0 degree. Scanning of the planar antenna 15 is carried out by using the motor drive section 19 and the motor 20, such that information regarding the frequency of passing through a slit (not shown) of the encoder 21 and the passage direction according to scanning of the planar antenna 15 is output to the signal processing section 11.

The signal processing section 11 includes a CPU 11a which controls the respective sections of the radar device 2 and carries out information processing at the time of data transmission/reception from/to the electronic control section 3, and a memory 11b which stores a program for the processing by the CPU 11a. The various functions of the CPU 11a are implemented by running the program. The relative distance or relative speed of the object with respect to the vehicle 1 is detected on the basis of the signal output from the A/D conversion section 18. The angle of the object when viewed from the vehicle 1 is detected on the basis of information output from the encoder 21. In this way, the relative distance, relative speed, and angle are detected as the parameter values of object information.

In this embodiment, information of an object detected by the radar device 2 is referred to as object information, and the parameter values of the object information include the relative distance, relative speed, angle, and the like. Of the parameter values of object information, the relative distance and relative speed are related to distance, thus the relative distance and relative speed are also referred to as distance parameter values.

The memory 11b of the signal processing section 11 stores a number of data, such as object information detected by object detection processing.

The electronic control section 3 electrically connected to the signal processing section 11 includes a CPU 3a and a memory 3b. The CPU 3a controls the respective sections of the vehicle 1 and carries out information processing at the time of data transmission/reception from/to the signal processing section 11. The memory 3b stores a program for the processing by the CPU 3a and data, such as object information transmitted from the signal processing section 11. Various functions of the CPU 3a are implemented by running the program.

The electronic control device 3 is electrically connected to the brake 40, the throttle 41, and the alarm 42. The brake 40, the throttle 41, and the alarm 42 are controlled in accordance with object information, such that the operation of the vehicle 1 is controlled. For example, if the vehicle 1 comes close to the object, the alarm 42 sounds an alarm to notify abnormality to the driver. When the vehicle 1 is likely to collide against the object, the brake 40 is operated to reduce the speed of the vehicle 1 or the throttle 41 is narrowed to reduce the number of revolutions of the engine.

The electronic control section 3 is connected to the vehicle speed sensor 30 which detects the speed of the vehicle 1, the steering sensor 31 which detects the steering angle of the steering wheel, and the yaw rate sensor 32 which detects the turning speed of the vehicle 1. If the steering sensor 31 and the yaw rate sensor 32 are used, the turning direction and turning speed of the vehicle 1 according to a steering operation can be detected. For this reason, both sensors are preferably provided, but even when any one of the steering sensor 31 and the yaw rate sensor 32 is used, the turning direction of the vehicle 1 can be detected.

The transmitted wave and the received wave transmitted and received by the planar antenna 15 are signals, such as electric waves, laser, or ultrasonic waves. Any signal may be used insofar as the signal is transmitted from the planar antenna 15, hits and is reflected by the object, and is received as a reflected wave, such that object information can be detected.

Although in this embodiment, the planar antenna 15 is used as an antenna, any antenna may be used insofar as the antenna can output the transmitted wave and receive the reflected wave of the transmitted wave from the object. Instead of the planar antenna 15, a lens antenna, a reflecting mirror antenna, or the like may be used. Although the transmitting antenna 15a and the receiving antenna 15b are provided separately, a transmitting/receiving antenna may be used such that transmission and reception can be carried out by a single antenna.

Next, a FM-CW (Frequency Modulated Continuous Wave) radar system which is an example of signal processing for the object detection processing will be described. The respective symbols in the following equation or for an FM-CW signal and a beat signal shown in FIG. 3 are as follows: fb: beat frequency, fs: frequency, fr: distance frequency, fd: speed frequency, fo: center frequency of transmitted wave, Δf: frequency shift width, fm: repetitive frequency of modulated wave, C: light speed (speed of electric wave), T: reciprocation time of electric wave to object, R: distance to object, and v: relative speed of object.

Figure 3:
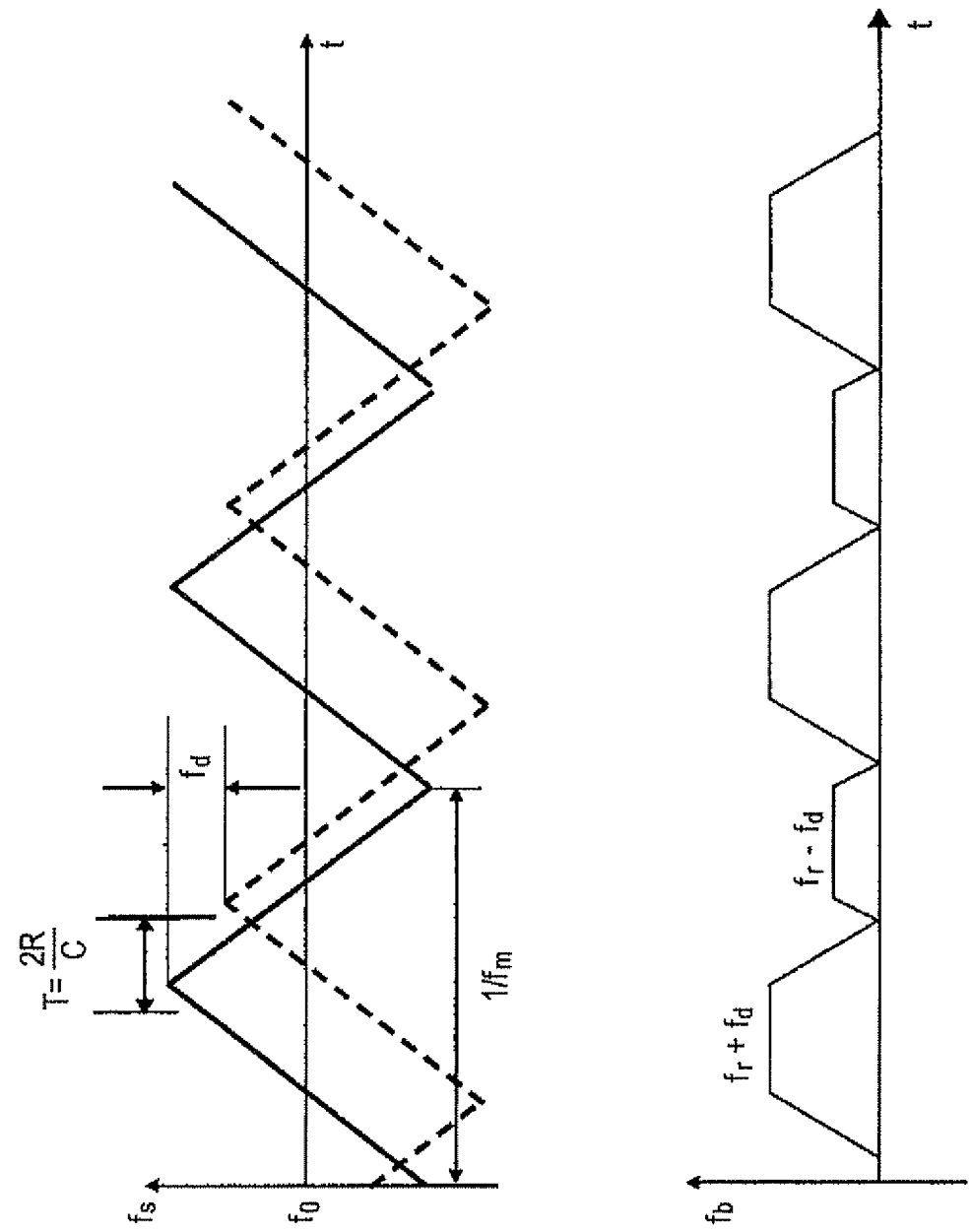
FIG. 3 is a diagram illustrating an FM-CW signal and a beat signal.

An upper view of In FIG. 3 shows the signal waveforms of FM-CW transmitted signal and received signal. A lower view of FIG. 3 shows a beat frequency which is generated in accordance with a differential frequency between the transmitted signal and the received signal. The relationship between the transmitted wave and the received wave is shifted in accordance with a Doppler shift caused by the distance between the vehicle 1 having the radar device 2 and the object, and the relative speed.

In the upper view of FIG. 3, the horizontal axis represents time, and the vertical axis represents frequency. In the drawing, a transmitted signal indicated by a solid line changes in frequency in a predetermined cycle, and has an up period where the frequency rises and a down period where the frequency of the transmitted wave rises to a predetermined frequency and then falls to a predetermined frequency. The transmitted signal repetitively changes such that the frequency falls to a predetermined frequency and then rises again to a predetermined frequency. The transmitted signal is received after hitting and being reflected by the object and becomes a received wave indicated by a broken line in FIG. 3. Similarly to the transmitted signal, the received signal has an up period and a down period. In this embodiment, for example, a frequency band of 76 Ghz is used.

The received signal has temporal delay (T=2R/C) in accordance with the distance between the vehicle 1 and the object compared to the transmitted signal. When a speed difference is provided between the vehicle 1 and the object, the received signal is shifted in parallel to the axis of the frequency fs compared to the transmitted signal. The Doppler shift becomes fd.

In the lower view of FIG. 3 in which the horizontal axis represents time and the vertical axis represents beat frequency, a beat frequency is calculated by Equation (1).

$$fb = fr \pm fd = (4 \cdot \Delta f \cdot fm/C)R + (2 \cdot f0/C)v \quad (1)$$

FFT processing described below is carried out for the beat signal expressed by Equation (1) to detect a frequency spectrum. A frequency spectrum, which exceeds a predetermined threshold value, from the detected frequency spectrum is detected as a peak signal, and the relative distance and relative speed between the vehicle 1 and the object are calculated.

Figure 4:
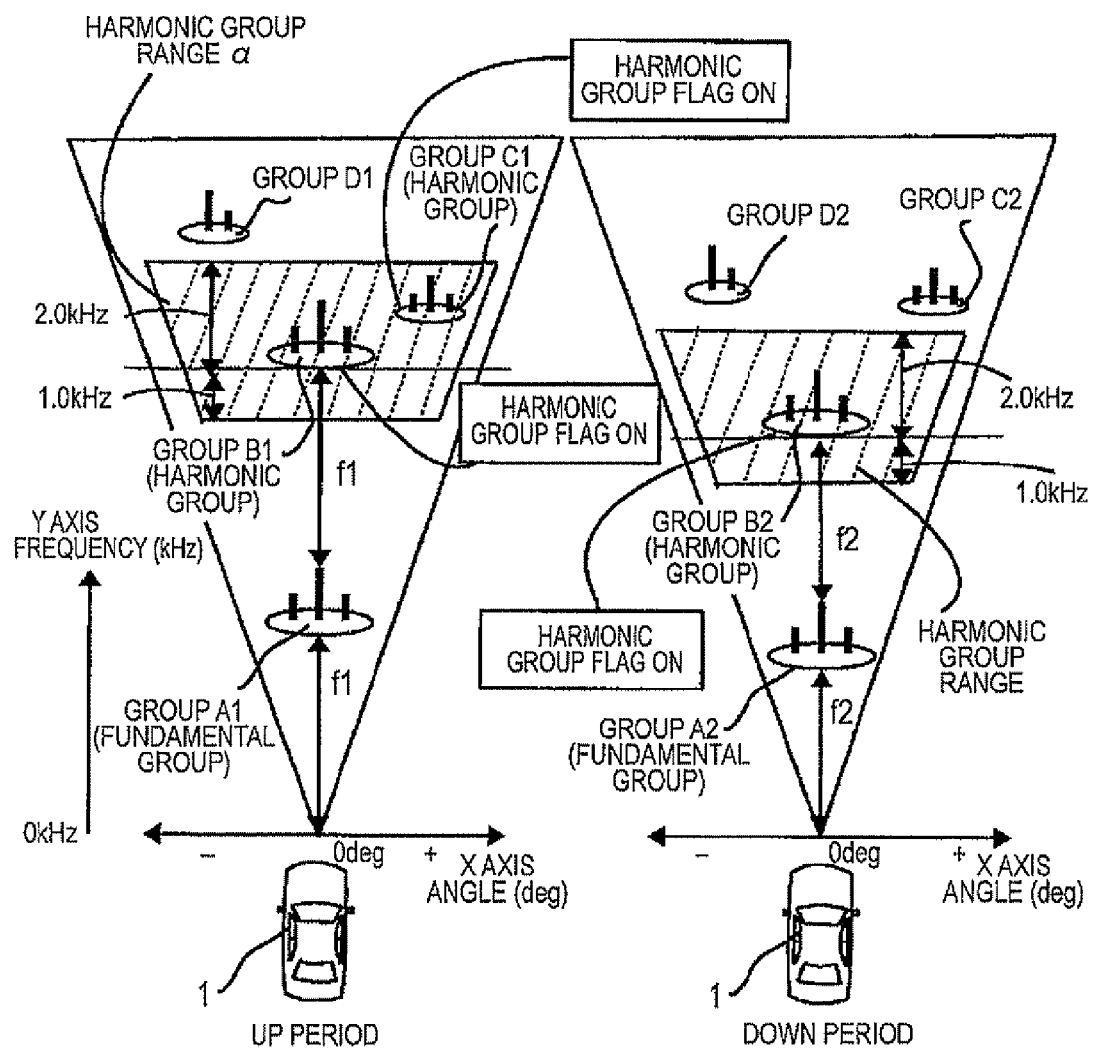
FIG. 4 is a diagram illustrating harmonic group detection processing.

Processing for combining peak signals of the same object from among the peak signals detected by the FFT processing as a single group is called grouping, FIG. 4 shows harmonic group detection processing for detecting a group within a range of a substantially integer multiple of the frequency of a reference group from among the groups of peak signals subjected to the grouping.

In FIG. 4, peak signals extracted by peak extraction processing after the FFT processing are shown in a region where the horizontal X axis represents angle (deg) and the vertical Y axis represents frequency (khz). With regard to the horizontal axis, when the preceding vehicle is located directly in front of the vehicle 1, the angle is set to be 0 degree if the planar antenna 15 is perpendicular to the preceding vehicle, the left side represents a negative angle, and the right side represents a positive angle. With regard to the vertical axis, as the distance is away from the vehicle 1, the frequency is high. The peak signals are grouped, and grouped peak signals are shown in each of the up period and the down period.

The processing for grouping the peak signals collects and groups a plurality of associated peak signals from the signal intensity (power), angle, and frequency as information of a single object. The up period shown in FIG. 4 has groups A1, B1, C1, and D1 in which the peak signals are grouped, and the down period has groups A2, B2, C2, and D2 in which the peak signals are grouped similarly.

In the up period, a harmonic group range α is set with the group A1 having a lowest frequency as a fundamental group. The harmonic is generated when a frequency spectrum is generated with a frequency of an integer multiple of a predetermined frequency, and the frequency spectrum exceeds a predetermined threshold value and is detected as a peak signal. In this case, although there is no object originally, a peak signal is detected.

Although in this embodiment, the fundamental group A1 is detected by the same object detection processing which detects other groups, the fundamental group may be a group of peak signals related to object information detected by previous object detection processing.

In this embodiment, the harmonic group range α is set with a frequency (f1×2) two times larger than the frequency f1 of the group A1 in the Y-axis direction and has a width from a frequency higher than the frequency f1 by about 2.0 khz to a frequency lower than the frequency f1 by about 1.0 khz. When the preceding vehicle is located directly in front of the vehicle 1, in the X-axis direction, if the angle is set to be 0 deg when the planar antenna 15 is perpendicular to the preceding vehicle, for example, the range of ±4 deg left and right, that is, 8 deg in total, is set as the harmonic group range α.

The harmonic group range α includes the group B1 and the group C1. These groups are set as a specific peak signal group. The setting may be made by turning on a harmonic group flag, for example. Thus, it is easy to discriminate a group of specific peak signals of a harmonic which is non-existent as an object originally from a group of peak signals of an object.

In the down period, a harmonic group range β is set with the group A2 having a lowest frequency as a fundamental group. The difference in frequency in the up period and the down period is due to the movement of the peak signal caused by the temporal difference between the up period and the down period. Other range setting conditions are the same as in the up period. Although in this embodiment, the up period and the down period have a single fundamental group, two or more fundamental groups may be used to detect a harmonic group.

When pairing processing described below is carried out after the peak signals are extracted by the FFT processing, without carrying out the grouping processing, at the time of the pairing processing, peak information corresponding to fundamentals and harmonics is set in the same manner as the method of setting the harmonic group range, and peak signals within a predetermined range are set as a specific peak signal.

Figure 5:
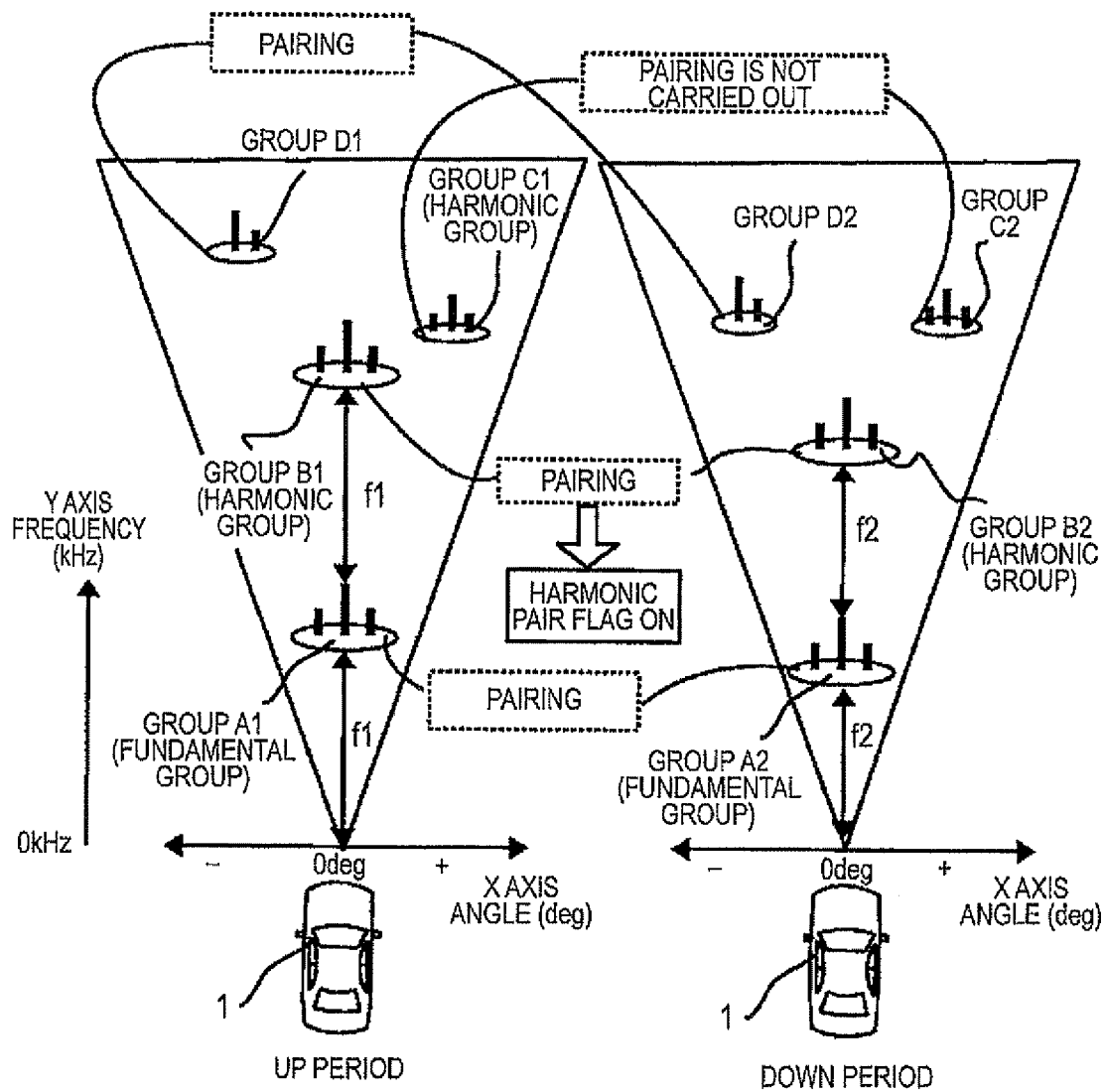
FIG. 5 is a diagram illustrating pairing processing.

Next, FIG. 5 shows processing for pairing the groups in the up period and the groups in the down period described with reference to FIG. 4. The contents of the Y axis and the X axis are the same as the description with reference to FIG. 4. With regard to the pairing processing, the group A1 in the up period and the group A2 in the down period are paired, and the group D1 in the up period and the group D2 in the down period are paired. The pairing is carried out on the basis of the conditions of the frequency of each group in the up period and the down period, angle, the setting state of the specific peak signal group (whether or not the harmonic group flag is turned on), and the like. With regard to the group B1 in the up period and the group B2 in the down period, since the harmonic group flag is turned on, if other pairing conditions of the frequency, angle, and the like are satisfied, pairing is carried out. Data of the paired groups is stored in the memory 11b of the signal processing section 11 as object information. Data of the unpaired groups is not stored in the memory 11b. In particular, data of the paired groups with the harmonic group flag turned on is stored in the memory 11b of the signal processing section 11 of the specific object information. In this case, a harmonic pair flag which is the flag of the stored object information is turned on to indicate specific object information.

With regard to the group C1 in the up period and the group C2 in the down period, since only the group C1 has the harmonic group flag turned on and the group C2 has the harmonic group flag not turned on, pairing is not carried out.

Figure 6:
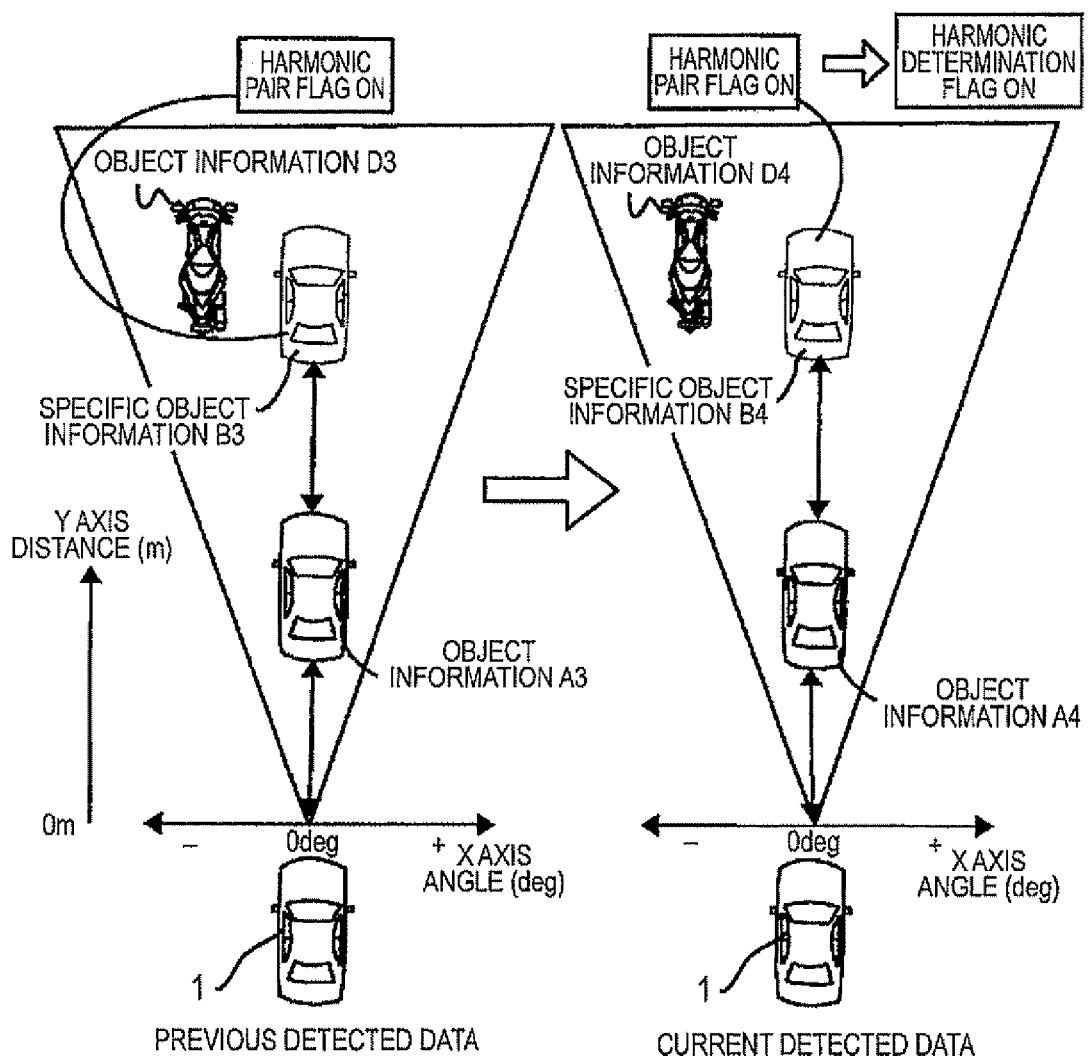
FIG. 6 is a diagram illustrating multiple continuous object detection processing.

FIG. 6 is a diagram showing processing for determining whether the same object is continuously detected or not during multiple continuous object detection processing. Although in FIGS. 4 and 5, the detection ranges of the up period and the down period are respectively shown, in FIG. 6, with regard to data of each of the up period and the down period, data after being stored in the memory 11b as object information or specific object information by the pairing processing is displayed. This indicates that data of object information and specific object information is detected during each of multiple continuous object detection processing.

Of data stored in the memory 11b, previous detected data includes object information A3, specific object information 133, and object information D3. Current detected data includes object information A4, specific object information 134, and object information D4.

The object information A3 of previous detected data and the object information A4 of current detected data, the specific object information B3 of previous detected data and the specific object information 134 of current detected data, and the object information D3 of previous detected data and the object information D4 of current detected data are respectively related to the same object which is continuously detected during multiple continuous object detection processing. Of these, the specific object information 133 and the specific object information B4 have a harmonic pair flag turned on, thus the harmonic determination flag of the specific object information B4 of current detected data having continuity is turned on, and the specific object information B4 is stored in the memory 11b.

When new object information or specific object information which is not in previous detected data is detected from current detected data, the object information is stored in the memory 11b and is compared with subsequent detected data to determine whether or not the same object is continuously detected.

During the multiple continuous object detection processing, when the same object is continuously detected, object information or specific object information is transmitted from the radar device 2 to the electronic control device 3 and is used by the electronic control device 3 as data for vehicle control of the respective sections. Therefore, erroneous object detection can be prevented, and vehicle control can be performed on the basis of accurate object information detected by the radar device 2, such that safe vehicle control can be provided to the user.

<2. Operation>

Figure 7:
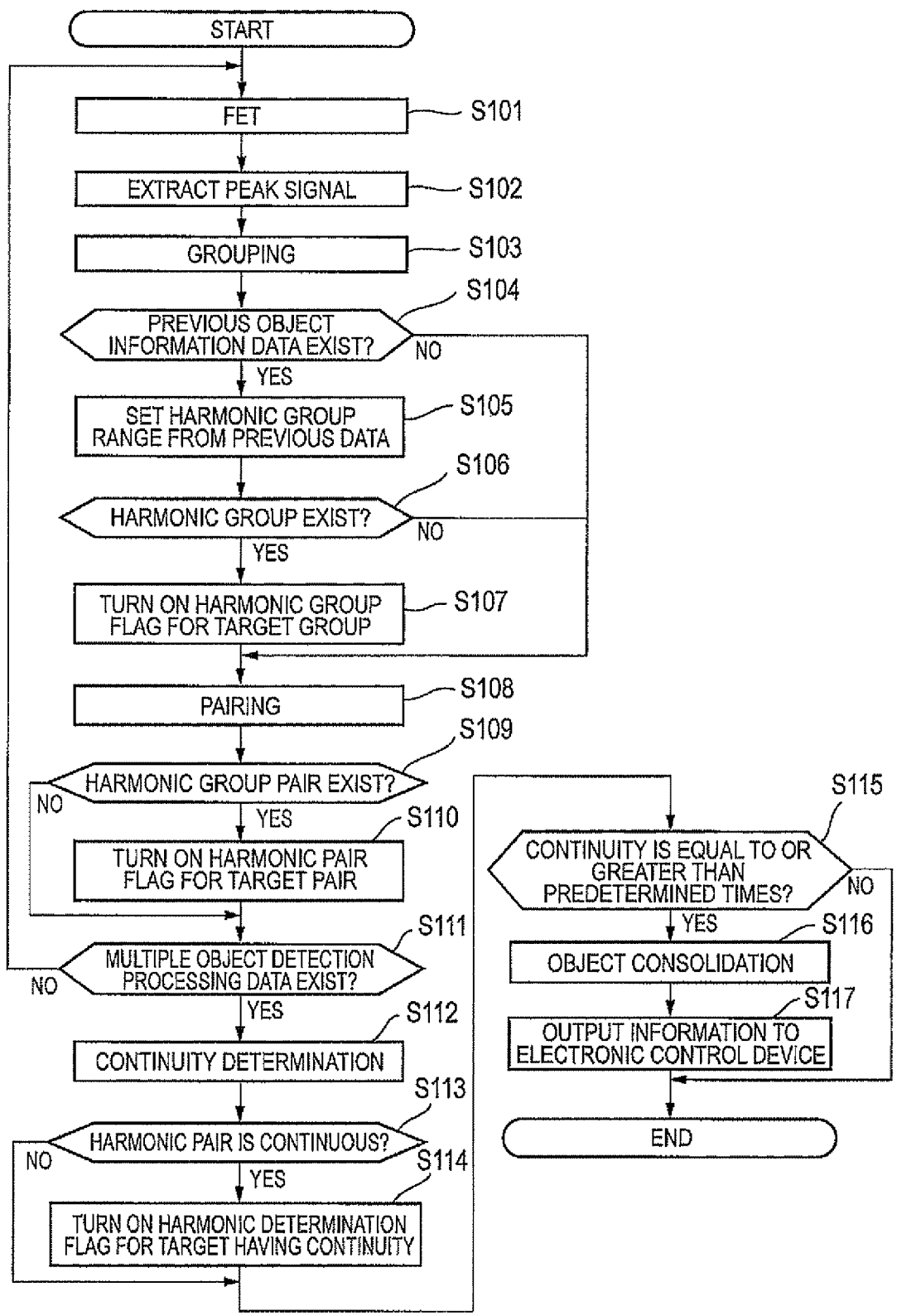
FIG. 7 is a flowchart of object detection processing.

Next, the object detection processing will be described with reference to a flowchart of FIG. 7.

A transmitted wave transmitted from the planar antenna 15 of the radar device 2 hits and is reflected, and a received wave is subjected to FFT processing in each of the up period and the down period, such that a frequency spectrum is obtained (Step S101).

In order to discriminate the detected frequency spectrum from noise, a predetermined threshold value (for example, a threshold value when a frequency spectrum equal to or greater than 13 khz is set as a peak signal) is provided, and a frequency spectrum which exceeds the threshold value is extracted as a peak signal (Step S102).

Then, the extracted peak signals are grouped into a group of information from a single object in accordance with the frequency or power of the signal (Step S103). Specifically, this step corresponds to grouping of the peak signals shown in FIG. 4.

After the grouping is carried out, object information which satisfies a predetermined condition is searched from previous object information stored in the memory 11b. The object information which satisfies the predetermined condition refers to object information which is close to the vehicle 1 and becomes a control target of the vehicle 1, for example, like an object which is closest to the vehicle 1 at a distance equal to or smaller than 10 m from the vehicle 1.

When there is previous object information which satisfies the predetermined condition (Yes in Step S104), processing is carried out for detecting, from object information of previous data which satisfies the predetermined condition, specific object information having a distance parameter value of a substantially integer multiple of the object information. Specifically, first, a harmonic group range for detecting harmonic group data corresponding to a specific peak signal group is set (Step S105). The harmonic group range is shown in FIG. 4. That is, in the up period, the harmonic group range is set with a frequency (fx2) of an integer multiple of the frequency of the group A1 in the Y-axis direction, and has a width from a frequency higher than the relevant frequency by about 2.0 khz to a frequency lower than the relevant frequency by about 1.0 khz. In the X-axis direction, when the preceding vehicle is located directly in front of the vehicle 1, the angle is set to be 0 degree if the planar antenna 15 is perpendicular to the preceding vehicle, and the range of 4 degrees left and right, that is, 8 deg in total, is set as the harmonic group range.

If there is a group within the set harmonic group range (Yes in Step S106), the harmonic group flag of the target group is turned on (Step S107). In FIG. 4, the group 131 and the group C1 are included in the harmonic group range a of the up period, and the group B2 is included in the harmonic group range β of the down period. If there is no group within the set harmonic group range (No in Step S106), since there is no target group, the harmonic group flag is not turned on for any groups.

After the determination of presence/absence of a harmonic group is completed, pairing is carried out for the groups in the up period and the groups in the down period shown in FIG. 5 (Step S108). Of the groups to be paired, pairing is carried out only for a group with the harmonic group flag turned on in one period and a group with the harmonic group flag turned on in the other period. Therefore, a peak signal which is existent as an object and a peak signal which is non-existent as an object can be prevented from being erroneously paired.

As described above, only when the groups with the harmonic group flag turned on are respectively existent in the up period and the down period (Yes in Step S109), pairing is carried out and the harmonic pair flag is turned on (Step S110). Pairing of groups with the harmonic group flag not turned on (turned off) is carried out on the basis of information regarding frequency or angle.

During the pairing processing, when the groups with the harmonic group flag turned on are non-existent in the up period and the down period (No in Step S109), the harmonic pair flag is not turned on for the paired groups, and data is stored in the memory 11b as object information. When there is multiple object detection processing data in the memory 11b (Yes in Step S111), the continuity determination of the object is carried out (Step S112).

The continuity determination of the object is processing for determining whether, of data stored in the memory 11b as object information or specific object information by pairing during the object detection processing, object information related to the same object is continuously detected during the multiple object detection processing or not. During the processing for continuity determination, processing for setting object information of a fundamental as the reference of calculating a harmonic group will be described below in detail.

Therefore, it is possible to determine whether or not object information with the harmonic pair flag turned on is continuously detected during the multiple object detection processing, and to prevent erroneous continuity determination from being carried out for object information with the harmonic pair flag turned on and object information with the harmonic pair flag turned off. When multiple object detection processing data is not stored in the memory 11b (No in Step S111), new object detection processing is carried out from the beginning.

At the time of continuity determination, if object information with the harmonic pair flag turned on has continuity (Yes in Step S113), the harmonic determination flag is turned on for the target having continuity (Step S114). If object information with the harmonic pair flag turned on has no continuity (No in Step S113), the harmonic determination flag is not turned on for any target data, and the process progresses to the next step.

If the continuity is equal to or more than a predetermined number of times (Yes in Step S115), object consolidation is carried out for combining a plurality of object information stored in the memory 11b to generate information of a single object (Step S116), and object information is output to the electronic control device 3 (Step S117). The continuity being equal to or more than a predetermined number of times means that object information or specific object information related to the same object is detected two times or three or more times, for example.

Therefore, vehicle control can be accurately performed with respect to an object, and safe vehicle control can be provided to the user.

With regard to the above-described harmonic determination processing, such as the harmonic group flag being turned on for the harmonic groups, the harmonic pair flag being turned on for the harmonic pair, and the harmonic determination flag being turned on for the harmonic group pair having continuity, when the vehicle is traveling at a low speed, the mode may be switched from a mode for normal object information detection to a mode for detection of specific object information related to harmonics. The low-speed traveling refers to a case where the vehicle 1 is traveling at a speed equal to or lower than 10 km/h in accordance with information from the vehicle speed sensor 30. In this case, the mode for detection of specific object information related to harmonics is operated. Thus, when there are many objects close to the vehicle 1 which is traveling at a low speed, in other words, when there is a high probability that harmonics appear, such processing is carried out, such that pairing of a harmonic group and a normal group which is not a harmonic can be prevented or erroneous continuity determination for object information with the harmonic pair flag turned on and normal object information which is not a harmonic can be prevented. Further, the use environment of the object detection system can be expanded, and safe vehicle control can be provided to the user.

Figure 8:
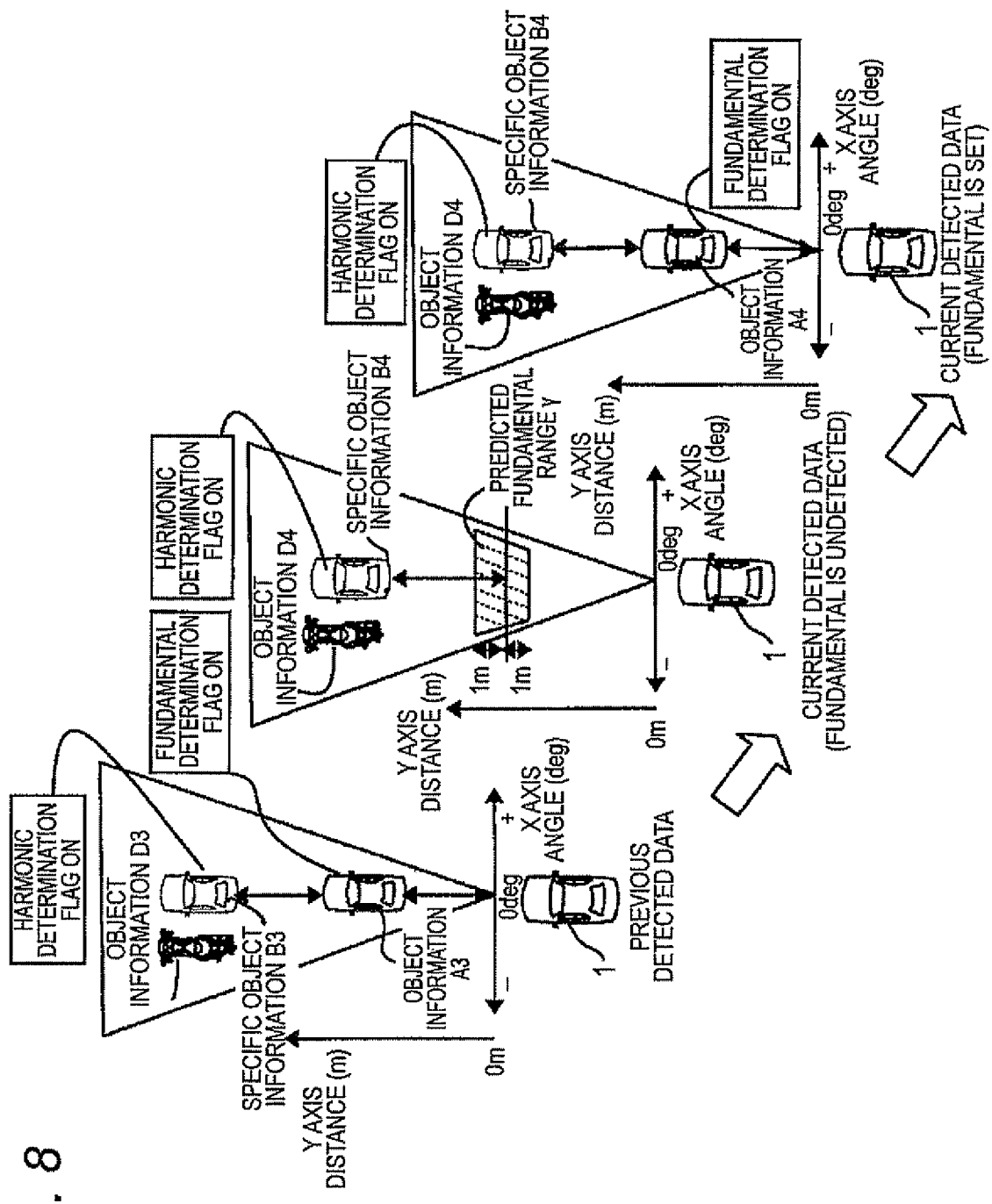
FIG. 8 is a diagram illustrating fundamental object information setting processing.

Next, fundamental object information setting processing during the above-described continuity determination (Step S112) will be described with reference to FIG. 8. In FIG. 8, previous detected data includes object information A3, specific object information 83, and object information D3 stored in the memory 11b of the signal processing device 11. These kinds of object information are object information detected by the object detection processing. Of these, the object information A3 has a fundamental determination flag turned on, and the specific object information B3 has the harmonic determination flag turned on. The fundamental determination flag is turned on for object information as the reference of detecting data related to harmonics, such as the harmonic group, the harmonic group pair, and the like.

Then, it is determined whether or not there is object information with the fundamental determination flag turned on within a predicted fundamental range $\gamma$ which has a width of about 1 m before and after the position, at which the relative distance and the relative speed as distance parameter values become half ($\frac{1}{2}$), in the Y-axis direction at the same angle as object information with the harmonic determination flag turned on during next object detection processing and is the range of ±4 degrees which is the same angle as at the time of the above-described harmonic group determination when the front of the vehicle is set to be 0 degree.

When no object information with the fundamental determination flag turned on is detected within the predicted fundamental range $\gamma$, in other words, when object information related to fundamentals is not continuously detected during the continuous object detection processing, object information A4 with the fundamental determination flag turned on is virtually set at the same angular position as when the relative distance and relative speed as the distance parameter values of object information with the harmonic determination flag turned on become half. Therefore, continuous determination processing of the same object can be continuously carried out during each object detection processing. Further, object information regarded as a fundamental which is required for vehicle control can be prevented from being not subjected to vehicle control although the object information is existent in the vicinity of the vehicle.

During the processing for storing object information detected by the object detection processing in the memory 11b of the signal processing device 11, when the object information related to the same object is not continuously detected during the multiple object detection processing, the object information stored in the memory 11b is deleted.

However, a frequency spectrum related to an object which has a small relative distance from the vehicle 1 is in a low frequency band (for example, equal to or lower than 13 khz) in proportion to distance, and in the low frequency band, many frequency spectrums are generated by the effect of noise due to frequency modulation of the transmitted wave or the received wave or noise generated from hard equipment. Thus, the threshold value for detecting the peak signal is set to a high power value, and during multiple continuous object detection processing, a peak signal close to the vehicle may not be continuously detected.

For this reason, when continuous detection is impossible during multiple continuous object detection processing, and only when processing is carried out for deleting the object information with the fundamental determination flag turned on which is stored in the memory ib, predicted object information may be set as object information within the predicted fundamental range γ from specific object information with the harmonic determination flag turned on.

Therefore, object information can be prevented from being erased from the memory 11b although it is existent as an object, and safe vehicle control can be provided to the user.

Next, the fundamental object information setting processing described hitherto will be described with reference to a flowchart of FIG. 9. First, it is determined whether or not the fundamental determination flag is turned on for previous detected data stored in the memory 11b during the continuous determination process (Step S201). When the fundamental determination flag is turned on (Yes in Step S201), next, it is determined whether the harmonic determination flag is turned on or not during next object detection processing (Step S202). When the fundamental determination flag is not data being turned on for previous detected data (No in Step S201), the process ends.

When the harmonic determination flag is data being turned on (Yes in Step S202), the predicted fundamental range γ is set (Step S203). As described above, the predicted fundamental range has a width of about 1 m before and after from the position, at which the relative distance and the relative speed as distance parameter values of object information with the harmonic determination flag turned on become half (½), in the Y-axis direction and is the range of ±4 degrees which is the same angle as at the time of the above-described harmonic group determination when the front of the vehicle is set to be 0 degree. When the harmonic determination flag is not turned on (No in Step S202), the process ends.

After the predicted fundamental range γ is set, detection processing of object information with the fundamental determination flag turned on is carried out (Step S204). If object information with the fundamental determination flag turned on is detected by the fundamental detection processing (Yes in Step S205), the object information with the fundamental determination flag turned on is set as fundamental object information (Step S206).

When the object information with the fundamental determination flag turned on is not detected (No in Step S205), predicted fundamental object information calculated on the basis of data with the harmonic determination flag turned on is set within the predicted fundamental range γ as fundamental object information subject to continuity determination (Step S207). Therefore, object information regarded as a fundamental which is required for vehicle control can be prevented from being erased from the memory 11b of the signal processing device 11 although the object information is existent in the vicinity of the vehicle, and safe vehicle control can be provided to the user.

When object information with the fundamental determination flag turned on is not detected, the processing for setting predicted fundamental object information calculated on the basis of data with the harmonic determination flag turned on within the predicted fundamental range γ as fundamental object information can be carried out when object information stored in the memory 11b is not continuously detected during multiple continuous object detection processing and only when the processing is carried out for deleting object information from the memory 11b.

Therefore, object information subject to vehicle control can be prevented from being erroneously erased from the memory 11b, and safe vehicle control can be provided to the user.

The fundamental object information setting processing may be carried out only during low-speed traveling. The low-speed traveling refers to a case where the vehicle 1 is traveling at a speed equal to or lower than 10 km/h. Therefore, when information of an object close to the vehicle 1, that is, data of fundamentals is not continuously detected during multiple continuous object detection processing, predicted fundamental object information is calculated from object information with the harmonic determination flag turned on and is set as fundamental object information. Further, in the case of object information with the fundamental determination flag turned on, the fundamental object information setting processing is carried out for setting the object information as fundamental object information. Therefore, safe vehicle control can be provided to the user.

Although in the above description, the relative distance and relative speed are used as the distance parameter values of object information, only one of the relative distance and relative speed may be used. Further, a frequency which represents a peak signal serving as a detection source may be used as the distance parameter value of object information.

What is claimed is:

1. A signal processing device that performs object detection processing in which peak signals each representing a differential frequency between a transmitted signal in which a frequency thereof changes in a predetermined cycle and a received signal obtained by receiving a reflected wave of a transmitted wave based on the transmitted signal from an object are derived in a first period where the frequency of the transmitted signal rises and a second period where the frequency of the transmitted signal falls, and the peak signals in the first period are paired with the peak signals in the second period to detect object information related to the peak signals, the signal processing device comprising:

a range setting unit that sets a frequency range in each of the first period and the second period on the basis of a frequency of twice the peak signal related to the object information which has been detected in previous object detection processing;

a signal setting unit that sets a peak signal as a specific peak signal in a case where the peak signal is within the frequency range in each of the first period and the second period; and a paring unit that pairs the specific peak signal in the first period and the specific peak signal in the second period.

2. The signal processing device as set forth in claim 1, further comprising:

an information setting unit that sets object information related to the specific peak signal as specific object information in a case where the specific peak signal in the first period are paired with the specific peak signal in the second period; and a determining unit that determines whether the specific object information is continuously detected over multiple continuous object detection processing.

3. The signal processing device as set forth in claim 1,
wherein the signal processing device is configured to be mounted in a vehicle,
wherein the signal processing device further comprises an acquiring unit that acquires a speed of the vehicle, and
wherein the signal setting unit sets the peak signal as the specific peak signal only when the speed of the vehicle is lower than a predetermined speed.

4. A radar device comprising:
the signal processing device as set forth in claim 1;
a transmitting and receiving unit that outputs the transmitted wave and receives the reflected wave; and
an outputting unit that outputs the object information detected in the object detection processing of the signal processing device to an electronic control device which uses the object information.

5. A vehicle control system comprising:
the radar device as set forth in claim 4; and
a control unit that controls a vehicle on the basis of the object information output from the radar device.

6. A signal processing method for performing object detection processing in which peak signals each representing a differential frequency between a transmitted signal in which a frequency thereof changes in a predetermined cycle and a received signal obtained by receiving a reflected wave of a transmitted wave based on the transmitted signal from an object are derived in a first period where the frequency of the transmitted signal rises and a second period where the frequency of the transmitted signal falls, and the peak signals in the first period are paired with the peak signals in the second period to detect object information related to the peak signals, the signal processing method comprising:
setting a frequency range in each of the first period and the second period on the basis of a frequency of twice the peak signal related to the object information which has been detected in previous object detection processing;
setting a peak signal as a specific peak signal in a case where the peak signal is within the frequency range in each of the first period and the second period; and
pairing the specific peak signal in the first period and the specific peak signal in the second period.

7. A non-transitory computer-readable medium storing a computer-executable program for performing object detection processing in which peak signals each representing a differential frequency between a transmitted signal in which a frequency thereof changes in a predetermined cycle and a received signal obtained by receiving a reflected wave of a transmitted wave based on the transmitted signal from an object are derived in a first period where the frequency of the transmitted signal rises and a second period where the frequency of the transmitted signal falls, and the peak signals in the first period are paired with the peak signals in the second period to detect object information related to the peak signals, the program comprising:
instructions for setting a frequency range in each of the first period and the second period on the basis of a frequency of twice the peak signal related to the object information which has been detected in previous object detection processing;
instructions for setting a peak signal as a specific peak signal in a case where the peak signal is within the frequency range in each of the first period and the second period; and
instructions for pairing the specific peak signal in the first period and the specific peak signal in the second period.

* * * * *